G. H. VOGEL, B. D. LOBDELL & J. E. BALL.
SECTIONAL SPRING TIRE.
APPLICATION FILED DEC. 24, 1912.
1,156,333.
Patented Oct. 12, 1915.
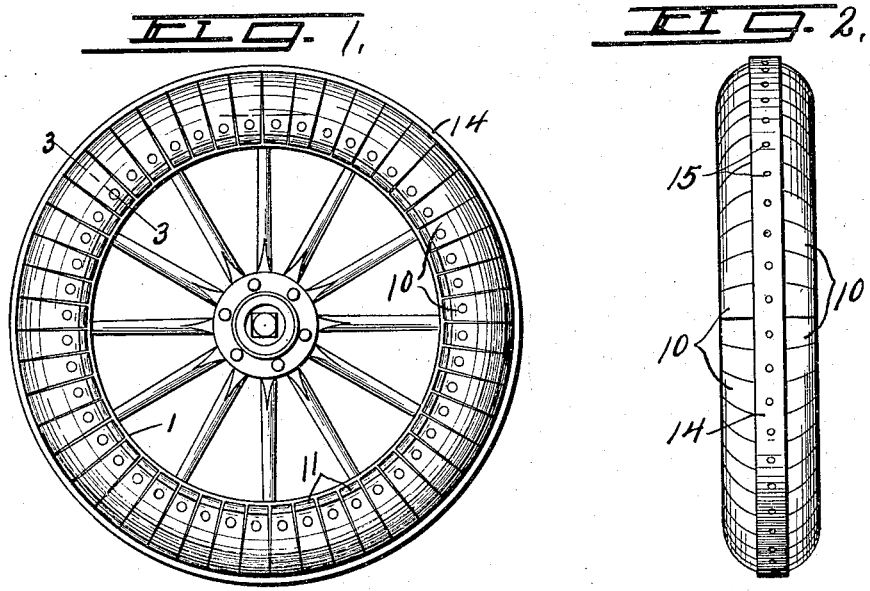
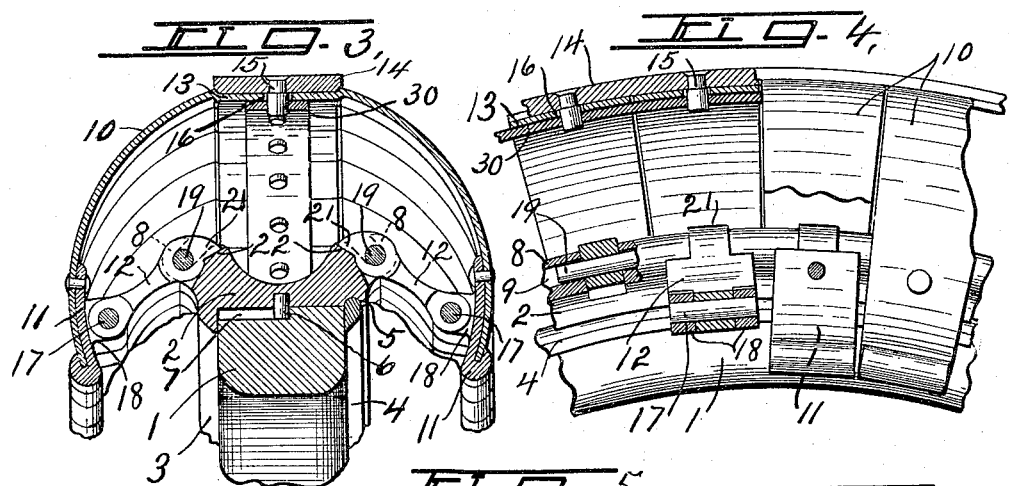
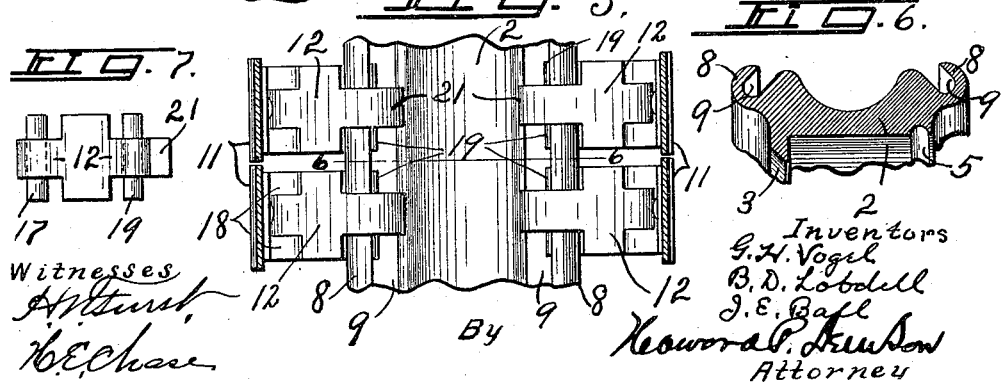

UNITED STATES PATENT OFFICE.

GEORGE H. VOGEL, BRITTON D. LOBDELL, AND JOSEPH E. BALL, OF SYRACUSE, NEW YORK; SAID LOBDELL ASSIGNOR TO SAID VOGEL AND SAID BALL.

SECTIONAL SPRING-TIRE.

1,156,333.   Specification of Letters Patent.   Patented Oct. 12, 1915.

Application filed December 24, 1912. Serial No. 738,504.

*To all whom it may concern:*

Be it known that we, GEORGE H. VOGEL, BRITTON D. LOBDELL, and JOSEPH E. BALL, of Syracuse, in the county of Onondaga, in the State of New York, have invented new and useful Improvements in Sectional Spring-Tires, of which the following, taken in connection with the accompanying drawings, is a full, clear, and exact description.

This invention relates to certain improvements in vehicle wheels for automobiles and similar vehicles requiring resilient tires, and refers more particularly to the structure of the tire and to the means for attaching the same to the rim or felly of the wheel.

The main object is to produce a commercially practical substitute for the usual pneumatic or cushion tire so as to obviate punctures, blow-outs and other troubles incidental to the use of inflated rubber tires, and, at the same time, maintain a uniform resiliency under varying loads.

Another object is to place the tire on the wheel in such manner as to partially envelop the rim and maintain a symmetrical relation thereto so that the rim will occupy a central position in the space between and some distance beyond the inner edges of the tire thereby permitting the use of a felly of relatively large diameter without increasing the size of the wheel.

A further object is to adjust the connections between the tire and rim so as to cause the edges of the tire to draw inwardly toward the rim and also toward the axis of the wheel when the tread of the tire is subjected to pressure as for example under load, thereby gradually reducing the transverse diameter and increasing the resistance of the spring segments as the load increases.

Other objects and uses will be brought out in the following description.

In the drawings, Figures 1 and 2 are respectively a side elevation and a face view of a vehicle wheel embodying the various features of our invention. Fig. 3 is an enlarged transverse section of a portion of the wheel taken on line 3—3, Fig. 1. Fig. 4 is a longitudinal sectional view through the center of a portion of the tire showing some of the adjacent spring segments and attaching members in elevation. Fig. 5 is an outer face view of a portion of the felly, rim and tire shown in Fig. 3. Fig. 6 is a transverse section through the rim. Fig. 7 is an inverted plan of one of the links.

The wheel shown in Figs. 1 and 2 is provided with a felly —1— of any suitable form, size or material preferably of wood, upon which is fitted a continuous metal rim —2— which is movable but is normally held in place against lateral movement by a relatively stationary annular flange —3— and an opposed relatively movable retaining ring —4— engaging opposite sides of the felly, the ring —4— being normally seated in an annular groove —5— in the adjacent side of the rim under spring tension.

The rim —2— may be held against relative circumferential movement in the felly by any suitable means as lugs —6— on the rim engaging in transverse grooves —7— in the felly thus permitting the rim to be displaced or replaced laterally when the ring —4— is removed.

The opposite edges of the rim are provided with outwardly diverging circular rows of lugs —8— having outwardly converging lengthwise slots —9— which extend through the periphery of the rim to form open sided bearings or hooks for the tire-supporting members presently described, said rows of lugs being spaced equi-distant from the longitudinal center of the rim and concentric with the axis of the wheel, the lugs being spaced uniform distances apart circumferentially.

The tire comprises a circular series of similar spring segments —10— arranged edge to edge circumferentially around but some distance apart from the rim —2— so as to partially envelop said rim and allow ample space for relative radial and lateral movement of the rim and tire under the resilient action of the spring segments. These spring segments —10— are of somewhat greater length than a half circle and arched outwardly transversely of and across the periphery of the rim but are relatively narrow circumferentially of said rim and are preferably made of sheet steel for lightness, strength and durability. The ends of these segments are disposed equi-distant from and at opposite sides of the rim and extend inwardly toward the axis of the wheel some distance beyond the periphery of said rim and are provided with separate reinforcing members —11— which are flexibly connected to their respective lugs —8— by separate links —12—.

The central tread portions of the springs —10— are slightly depressed inwardly to form circumferential recesses —13— for receiving and retaining a tread ring or band —14— which is fitted closely in said recesses to additionally bind the segments together against relative lateral displacement and also to relieve these portions of the springs from excessive wear or strain, said ring or band being provided with inwardly projecting radial studs —15— which fit loosely in radially alined apertures —16— in the springs —10— to hold the ring and springs against relative circumferential movement and at the same time allowing resilient action of the springs from end to end to avoid as far as possible rigid fastenings and consequent crystallization of said springs.

The reinforcing members —11— preferably consist of metal plates riveted or otherwise permanently secured to the inner faces of the ends of the springs and therefore constitute parts of the corresponding segments having their inner ends beaded around and forming grooves for the ends of said springs to additionally stiffen and support the same.

The links —12— constitute separately movable supports for the ends of their individual springs and for this purpose their outer ends are flexibly connected by separate pivots —17— to and between suitable lugs —18— which project inwardly from the inner faces of the corresponding plates —11— and are preferably integral therewith while the opposite ends of said links are flexibly connected by pivots —19— to and between the corresponding hook-shape lugs —8— on the rim —2—.

The radius of the circle in which the pivotal connections between the links —12— and ends of the spring segments —10— are located is considerably less than that of the circle in which the pivotal connections between said links and rim are disposed and, therefore, the links at opposite sides of the rim normally diverge inwardly therefrom at approximately an angle of 45° with the median plane of said rim so as to allow the ends of the segments —10— to yield or flex inwardly under load or pressure on the tread and against their normal outward tension.

The outward movement of the ends of the segments and also of the links under the normal outward tension of the springs is limited by shoulders —21— on the inner ends of the links normally engaging abutments —22— on the adjacent sides of the rim at the inner sides of the pivots —19— thereby normally keeping the ends of the springs in circumferential alinement and permitting either end of each spring to flex or yield under load or pressure independently of the other end or other springs. This normal outward tension of the ends of the springs also tends to retain the links —12— in interlocking engagement with the hook-shape lugs —8— of the rim but also permits said links to be attached to or detached from the lugs by abnormally springing the corresponding end of the segment toward the adjacent lug —8— sufficient to slip the pivot —19— through the open side of such lug.

It will be observed that when the tire is under load tending to press the tread springs inwardly toward the axis of the wheel the outer ends of the links will be similarly moved in the same direction but in addition to this movement will draw the ends of the springs toward the rim thereby shortening their radii and increasing their resistance in direct proportion to any increase of load while on the other hand when the load is relieved the tension of the springs will return them and their links to their normal positions.

In some instances we may prefer to use an inner ring or band —30— of less width than the outer band for additionally tying the spring segments together and adding further resilient resistance to the tread portion of the tire in which case the band —30— will be made of spring metal fitted closely against the inner faces of the segments —10— and provided with apertures for receiving the inner ends of the lugs —15— which serve to lock both of the bands and segments against relative circumferential movement.

What we claim is:

1. In combination with the rim of a vehicle wheel, a tire comprising a circular series of spring segments surrounding the rim and having their opposite sides provided with outwardly converging links pivoted to corresponding sides of the rim and constituting the only means of connecting the tire to the rim.

2. In combination with the rim of a vehicle wheel, a tire comprising a circular series of spring segments surrounding the rim and having their opposite sides provided with outwardly converging links pivoted to corresponding sides of the rim and constituting the only means of connecting the tire to the rim, said rim and links having coöperative means for limiting the outward swing of the links.

In witness whereof we have hereunto set our hands this seventh day of December, 1912.

GEORGE H. VOGEL.
BRITTON D. LOBDELL.
JOSEPH E. BALL.

Witnesses:
H. E. CHASE,
EVA E. GREENLEAF.

Copies of this patent may be obtained for five cents each, by addressing the "Commissioner of Patents, Washington, D. C."